US010056746B1

(12) United States Patent
Smith (10) Patent No.: US 10,056,746 B1
(45) Date of Patent: Aug. 21, 2018

(54) ELECTRICAL SLIP CONDUIT COUPLER (71) Applicant: Bridgeport Fittings, Inc., Stratford, CT (US)

(72) Inventor: Lawrence J. Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 0 days.

(21) Appl. No.: 15/858,208

(22) Filed: Dec. 29, 2017

(51) Int. Cl.
| | |
|---|---|
| *H02G 3/04* | (2006.01) |
| *H02G 3/06* | (2006.01) |
| *H01R 4/36* | (2006.01) |
| *H01R 4/30* | (2006.01) |
| *F16L 21/08* | (2006.01) |
| *F16L 25/01* | (2006.01) |

(52) U.S. Cl.
CPC ............... *H02G 3/06* (2013.01); *H01R 4/305* (2013.01); *H01R 4/36* (2013.01); *F16L 21/08* (2013.01); *F16L 25/01* (2013.01)

(58) Field of Classification Search
None
See application file for complete search history.

(56) References Cited

U.S. PATENT DOCUMENTS

| | | | |
|---|---|---|---|
| 3,402,947 A * | 9/1968 | Lewis | ...................... F16B 2/246 248/410 |
| 3,585,963 A | 6/1971 | Hiszpanski | |
| 3,703,303 A | 11/1972 | Eidelberg | |
| 4,067,534 A * | 1/1978 | Frey | ......................... B29C 65/02 285/293.1 |
| 4,073,514 A * | 2/1978 | Pate | ....................... F16L 37/091 285/149.1 |
| 5,165,735 A | 11/1992 | Nardi et al. | |
| D339,793 S | 9/1993 | Nardi et al. | |

(Continued)

FOREIGN PATENT DOCUMENTS

| | | |
|---|---|---|
| DE | 202007010452 U1 | 9/2007 |
| DE | 202013101069 U1 | 6/2014 |

(Continued)

OTHER PUBLICATIONS

"Snap2It® Connectors with the Widest Cable Ranges," Idea Digital Content, ideadigitalcontent.com, brochure; 2006; whole document.

*Primary Examiner* — Tho D Ta
(74) *Attorney, Agent, or Firm* — Ware, Fressola, Maguire & Barber LLP (57) ABSTRACT

An electrical slip conduit coupler has a body with an outer periphery and a cylindrical passageway passing through the body for receipt of conduits. The body has a bore extending through the outer periphery to the cylindrical passageway and first and second grooves located along its outer periphery on opposite sides of the bore. The coupler also has a stop clip with a central portion dimensioned to protrude through the bore into the cylindrical passageway, the stop clip has first and second arm portions that are dimensioned to engage the first and second grooves when the stop clip central portion protrudes through the bore, wherein at least one of the arm portions includes an outwardly extending region dimensioned for receipt of a tool to lift the stop clip, and wherein the body includes first and second sight slots to determine if electrical conduits are near the stop clip.

16 Claims, 12 Drawing Sheets

(56) References Cited

U.S. PATENT DOCUMENTS

| | | | |
|---|---|---|---|
| 5,654,526 A * | 8/1997 | Sharp | H02G 3/06 174/84 R |
| 5,799,984 A * | 9/1998 | Reynolds, Jr. | F16L 25/01 285/317 |
| 6,034,326 A | 3/2000 | Jorgensen | |
| 6,262,369 B1 | 7/2001 | Marik et al. | |
| 6,328,344 B1 | 12/2001 | Tozaki et al. | |
| 6,722,703 B2 | 4/2004 | Takayanagi | |
| D531,019 S | 10/2006 | Plumer | |
| 7,201,403 B2 | 4/2007 | Takayanagi et al. | |
| 7,338,092 B1 | 3/2008 | Cicconi, III | |
| 7,387,318 B2 | 6/2008 | Yoshida | |
| 7,438,328 B2 | 10/2008 | Mori et al. | |
| 7,614,665 B2 | 11/2009 | Hartmann | |
| 8,113,547 B2 | 2/2012 | Andre | |
| D681,159 S | 4/2013 | Ben-Horin et al. | |
| D690,192 S | 9/2013 | Takakuwa et al. | |
| D702,542 S | 4/2014 | Smith | |
| 8,782,872 B2 | 7/2014 | Lin et al. | |
| D745,382 S | 12/2015 | Faria et al. | |
| 9,523,454 B2 | 12/2016 | Schutte et al. | |
| D779,315 S | 2/2017 | Hinkle | |
| 9,705,295 B1 | 7/2017 | Smith | |
| 2004/0069517 A1 * | 4/2004 | Olson | H02G 3/06 174/481 |
| 2006/0151995 A1 | 7/2006 | Saarem et al. | |
| 2012/0086196 A1 * | 4/2012 | Smith | H02G 3/06 285/31 |

FOREIGN PATENT DOCUMENTS

| | | |
|---|---|---|
| EP | 1004805 A2 | 5/2000 |
| EP | 1722146 B1 | 10/2007 |
| EP | 2246607 A1 | 11/2010 |

* cited by examiner

ELECTRICAL SLIP CONDUIT COUPLER

TECHNICAL FIELD

The present invention is directed to electrical conduit couplers for coupling two electrical conduits together.

BACKGROUND OF THE INVENTION

Electrical conduit is commonly used to enclose electrical cables or electrical conductors. Electrical conduit is typically one of two types; namely, rigid conduit and electrical metallic tubing (EMT).

The present invention is directed to an improvement in electrical couplers used to couple two electrical conduits to each other.

SUMMARY OF THE INVENTION

The present invention relates to an electrical slip conduit coupler comprising a body having an outer periphery and having a cylindrical passageway passing through the body between a first end of the body and a second end of the body, the cylindrical passageway dimensioned for receipt of a first electrical conduit at a first end of the body and for receipt of a second electrical conduit at a second end of the body, the body having a bore extending through the outer periphery of the body to the cylindrical passageway, the body further having a first groove and a second groove located along the outer periphery of the body on opposite sides of the bore a stop clip having a central portion dimensioned to protrude through the bore and into the cylindrical passageway of the body so as to contact an electrical conduit positioned in the cylindrical passageway, the stop clip having first and second arm portions attached to the central portion, the first and second arm portions dimensioned to engage the first and second grooves when the stop clip central portion protrudes through the bore, wherein at least one of the first and second arm portions includes an outwardly extending region, the outwardly extending region dimensioned for receipt of a tool so as to lift the stop clip from the cylindrical passageway; and wherein the body includes a first sight slot and a second sight slot, each sight slot extending through the outer periphery of the body to the cylindrical passageway, the first sight slot positioned on the body so as to determine if a first electrical conduit is near the stop clip and the second sight slot positioned on the body so as to determine if a second electrical conduit is near the stop clip, and means for securing the first electrical conduit and the second electrical conduit or EMT to the coupler.

Another embodiment of the present invention is the electrical slip conduit coupler as described above, wherein the bore is located at approximately a midpoint along a longitudinal length of the body.

Another embodiment of the present invention is the electrical slip conduit coupler as described above, wherein the first sight slot is near said midpoint of the body and closer to the first end of the body than the second end of the body and wherein the second sight slot is near the midpoint of the body and closer to the second end of the body than the first end of the body.

A further embodiment of the present invention is the electrical slip conduit coupler as described above, wherein the body is fabricated from a steel tube.

A still further embodiment of the present invention is the electrical slip conduit coupler as described above, wherein both the first and second arm portions include an outwardly extending region, the outwardly extending region of each arm portion dimensioned for receipt of a tool so as to lift the stop clip from the cylindrical passageway.

Another embodiment of the present invention is the electrical slip conduit coupler as described above, wherein each outwardly extending region is adjacent the central portion.

Another embodiment of the present invention is the electrical slip conduit coupler as described above, wherein the stop clip is fabricated from spring steel.

A further embodiment of the present invention is the electrical slip conduit coupler as described above, wherein the first and second arm portions are each generally arcuate in shape.

A still further embodiment of the present invention is the electrical slip conduit coupler as described above, wherein the body has external threads formed at each end of the cylindrical passageway and wherein the means for securing the first electrical conduit and the second electrical conduit to the coupler is a compression style coupling, each compression style coupling having a gland ring and a compression nut, the compression nut having internal threads for mating with the external threads of the body.

A further embodiment of the present invention is the electrical slip conduit coupler as described above, wherein the body includes at least two bosses with internal threads passing through the outer periphery of the body, the bosses positioned on opposite sides of the body, and wherein the means for securing the first electrical conduit and the second electrical conduit to the coupler comprises screws dimensioned for threaded engagement with the threads of the bosses.

Another embodiment of the present invention is the electrical slip conduit coupler as described above, wherein the body is fabricated from a cast zinc alloy.

Another embodiment of the present invention is the electrical slip conduit coupler as described above, wherein the body is fabricated from a cast zinc alloy or machined steel.

Another embodiment of the present invention is the electrical slip conduit coupler as described above, wherein the first sight slot and the second sight slot are integrally formed with the bore so as to form a cross-shaped bore.

A further embodiment of the present invention is the electrical slip conduit coupler as described above, wherein the first groove and the second groove are each formed by dimples formed on the outer periphery of the body.

A still further embodiment of the present invention is the electrical slip conduit coupler as described above, wherein the outwardly extending region of the stop clip is adjacent the central portion of the stop clip.

Another embodiment of the present invention is a method of using the electrical slip conduit coupler comprising the steps of positioning the stop clip in the first and second grooves of the body with the central portion of the stop clip not fully inserted into the bore of the body, positioning the conduit coupler on a first electrical conduit so that the stop clip overlies the first electrical conduit, positioning a second electrical conduit so as to be substantially colinear with the first electrical conduit and sliding the conduit coupler toward the second electrical conduit until the stop clip central portion snaps inwardly relative to the bore so as to protrude through the bore into the cylindrical passageway and securing the first electrical conduit and second electrical conduit to the coupler.

BRIEF DESCRIPTION OF THE DRAWINGS

For a further understanding of the nature and objects of the present invention reference is made to the following detailed description taken in combination with the accompanying drawings.

DETAILED DESCRIPTION

FIGS. 1-5 illustrate a first embodiment of an electrical slip conduit conductor 40 according to a first embodiment of the present invention. As seen in these figures, the electrical slip conduit conductor includes a body 44 having an outer periphery 46, as well as a cylindrical passageway 48 passing through the body. The cylindrical passageway is dimensioned for receipt of electrical conduit 50 (rigid conduit or electrical metallic tubing). This is seen in FIGS. 16-23 for another embodiment of the present invention. The electrical conduit can thus be received at either a first end 52 of body 44 or a second end 54 of body 44.

As seen in FIGS. 1-5, body 44 includes a bore 56 that extends through outer periphery 46 of body 44 to passageway 48, the bore preferably located at approximately a midpoint or center line 99 (shown in phantom), between first end 52 and second end 54, along a longitudinal length (shown by line 55) of body 44. Of course, the bore could be positioned closer to one end of the body than the other end, as long as there is sufficient length of the cylindrical passageway to accommodate conduits from each end of the body.

Body 44 also has a first groove 60 and a second groove 62 (see FIG. 3) which are located along the outer periphery of the body on opposite sides of bore 56. Outer periphery 46 in this embodiment may have relatively flat segments 47, which can assist in gripping the body.

The electrical slip conduit conductor further includes a stop clip 64 having a central portion 66 that is dimensioned to protrude through bore 56 into the cylindrical passageway 48 of the body so as to contact an electrical conduit positioned within the central passageway from either first end 52 or second end 54. This is seen in FIG. 22 where central portion 66 can contact conduits 50 and 50' entering the cylindrical passageway of the body. The body shown in FIG. 22 is for a third embodiment of the present invention, however, the cylindrical passageway is the same and its operation with respect to the stop clip is the same as the embodiment shown in FIGS. 1-5, as well as the second embodiment shown in FIGS. 6-10 and the third embodiment shown in FIGS. 11-17 including the operation of the coupler illustrated in FIGS. 18-22.

Stop clip 64 also includes first and second arm portions 68 and 70 that attach to central portion 66. The first and second arm portions are dimensioned to engage with the first and second grooves 60 and 62 formed in body 44. The arm portions are typically arcuate in shape to conform with the outer periphery of the body.

Figure 1:
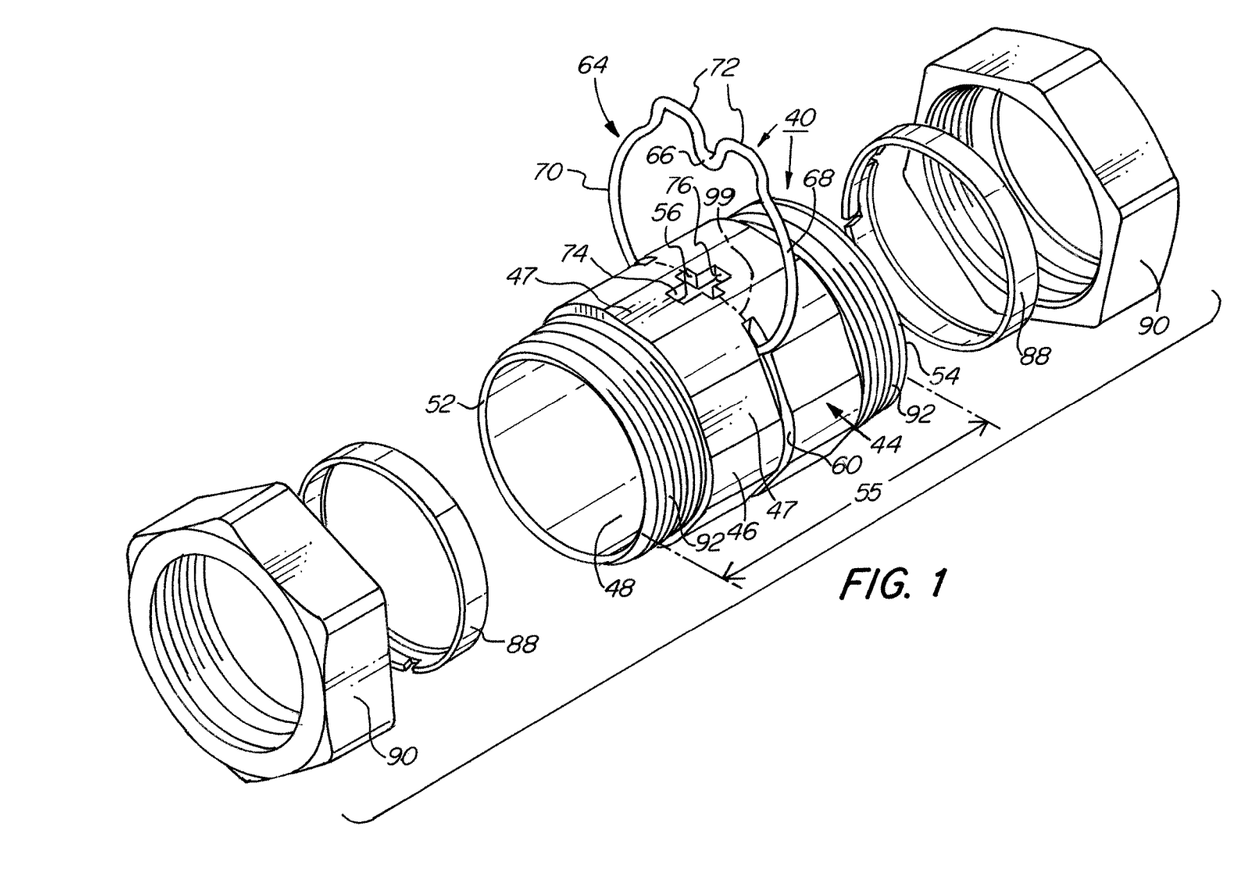
FIG. 1 is an exploded perspective view of a first embodiment of an electrical slip conduit coupler according to the present invention.
Figure 2:
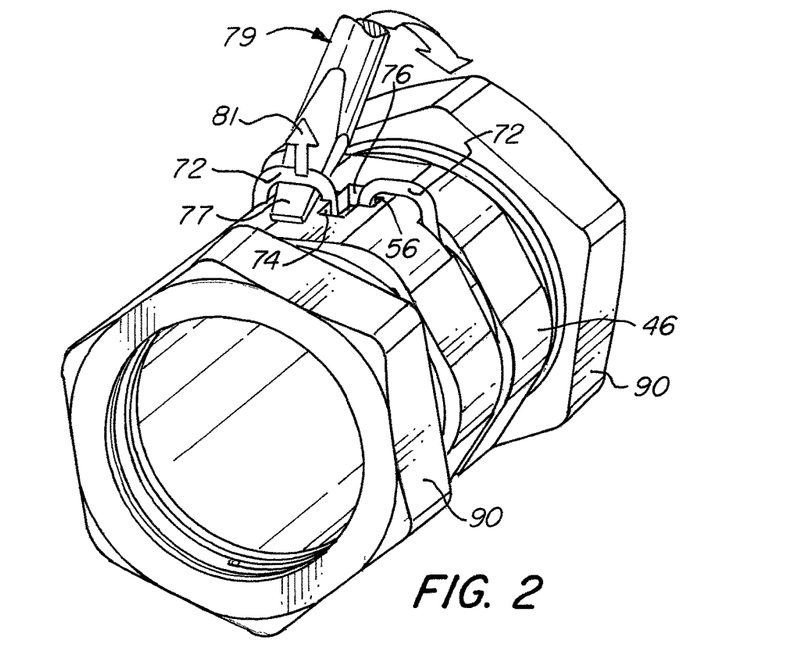
FIG. 2 is a perspective view of the electrical slip conduit coupler shown in FIG. 1.

In addition, as seen in FIG. 2, the first and/or second arm portions 68 and 70 of the stop clip include an outwardly extending region 72, with the outwardly extending region dimensioned for receipt of a tool, such as the blade 77 of a screwdriver 79 in order to pry the stop clip away from the body (see arrow 81) when it is desired to disengage the stop clip from the body. The outwardly extending region may be adjacent central portion 66, or located elsewhere along the arm portion. The first sight slot is thus positioned on body 44 so as to determine if an electrical conduit in cylindrical passageway 48 from first end 52 is near bore 56. The second sight slot is positioned on body 44 so as to determine if an electrical conduit in cylindrical passageway 48 from second end 54 is near bore 56.

Figure 3:
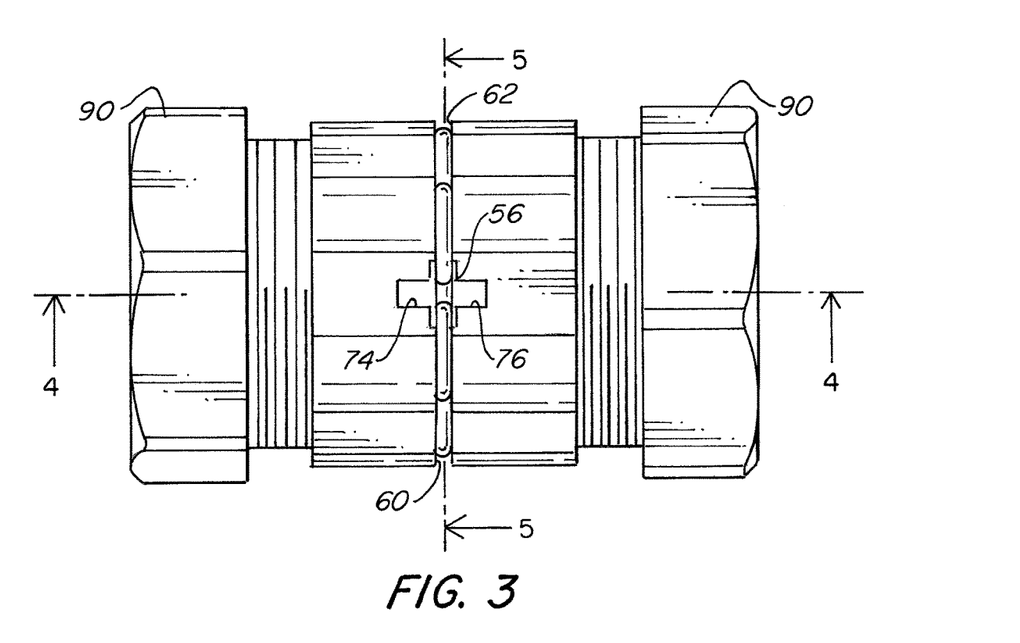
FIG. 3 is a top view of the electrical slip conduit coupler shown in FIG. 2.
Figure 4:
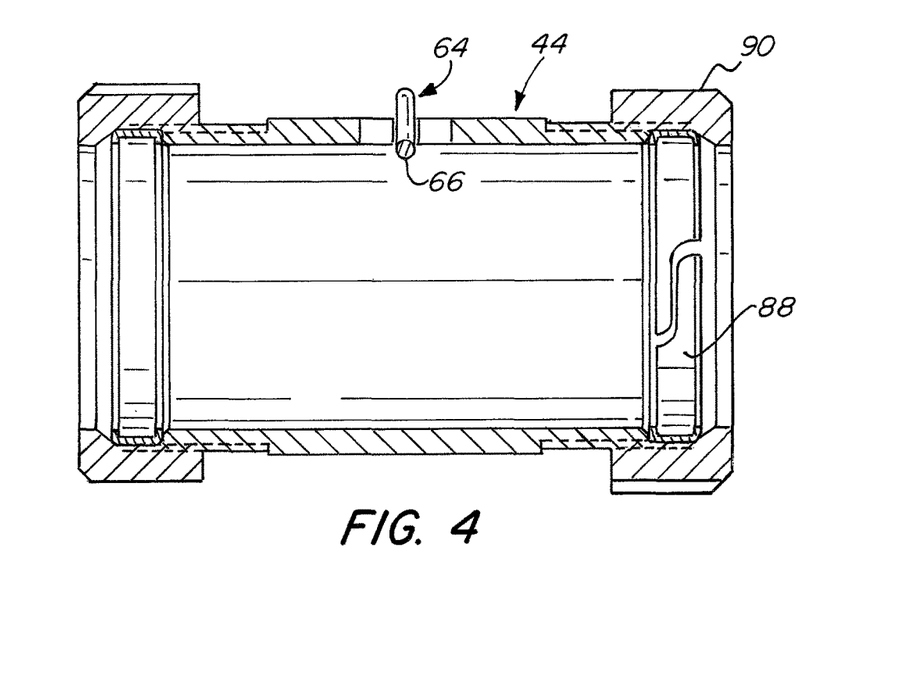
FIG. 4 is a cross-sectional view of the electrical slip conduit coupler taken along line 4-4 of FIG. 3.
Figure 5:
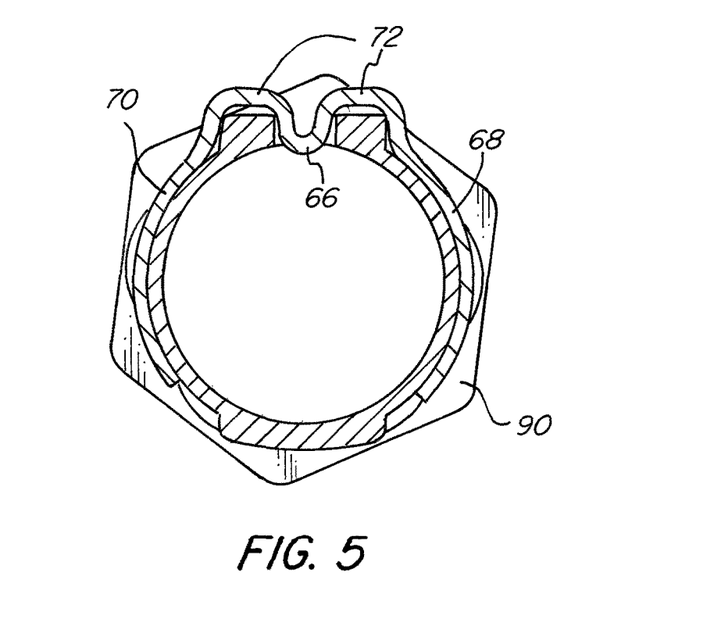
FIG. 5 is a cross-sectional view of the electrical slip conduit coupler taken along line 5-5 of FIG. 3.

As seen in FIGS. 3 and 18-22, in addition to bore 56 for receipt of the central portion 66 of stop clip 64, the body 44 also has a first sight slot 74 and a second sight slot 76 which as shown in FIGS. 2 and 3 can be adjacent bore 56. Sight slot 74 as seen in FIGS. 18-22 allows an installer to observe that an end 78 of an electrical conduit 50 is beneath or viewable through sight slot 74, while second sight slot 76 allows the installer to insure that a second conduit 50' has an end 78' viewable in the sight slot. This insures that conduits 50 and 50' are sufficiently inserted within cylindrical passageway 48 so as to achieve proper installation of the coupler to the conduits 50 and 50'. Stop clip 64 and, in particular, central region 66, when protruding into the central passageway prevents conduits 50 and 50' from extending beyond the midpoint of the coupler. This is best seen in FIG. 22 where ends 78 and 78' of conduits 50 and 50' respectively abut central region 66.

Figure 18:
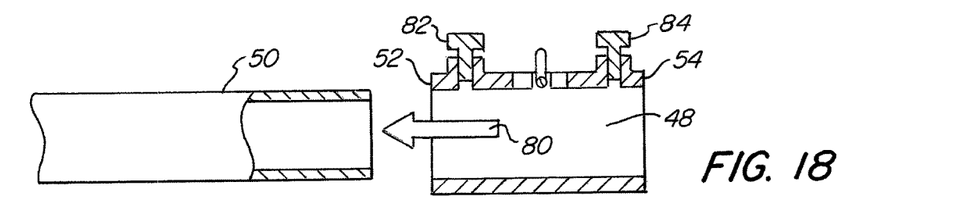
FIGS. 18-22 are diagrammatic representations of the third embodiment of the electrical slip conduit coupler showing how the coupler is used to couple two electrical conduits to each other.
Figure 19:
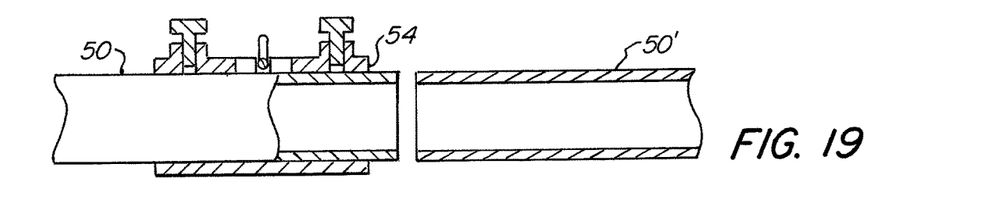
Figure 20:
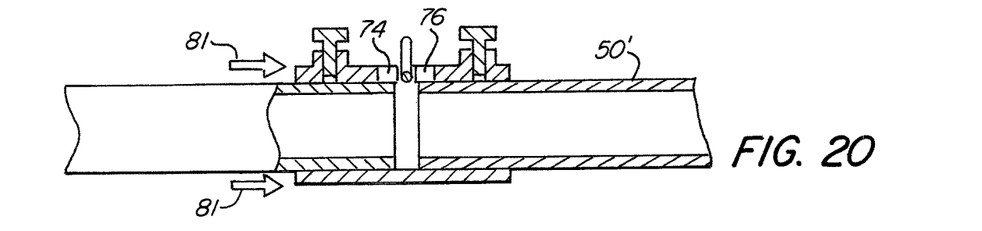
Figure 21:
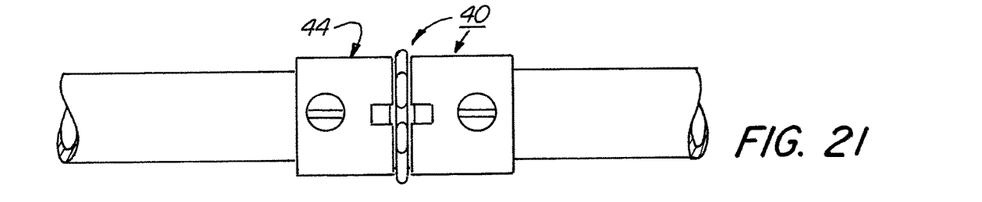
Figure 22:
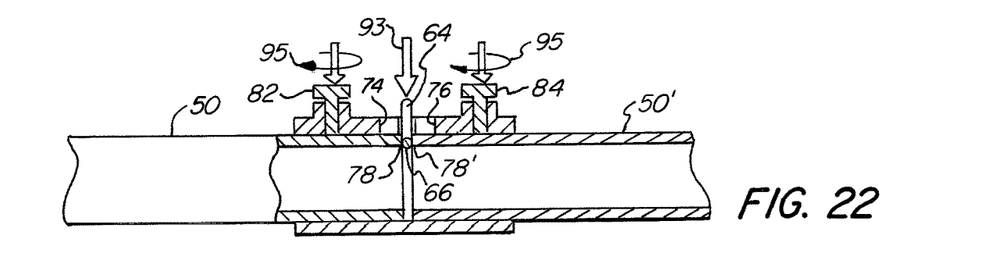

During installation as best seen in FIGS. 16-22, the stop clip is initially positioned so that its central portion 66 does not protrude within the cylindrical passageway 48. When in this position, as seen in FIG. 18, the coupler can be moved over conduit 50 as shown by arrow 80. When the coupler is in the position as shown in FIG. 19, a second conduit 50' can be aligned with the coupler body. Then, as shown in FIG. 20, coupler 40 can be moved in the direction of arrows 81, so as to slide over conduit 50'. When an installer sees first and second conduits 50 and 50' in respective first and second sight windows 74 and 76 as seen in FIGS. 20-22, the stop clip is able to move (snap) downwardly relative to the bore 56 in view of the spring action associated with arms 68 and 70. This spring action therefore allows central portion 66 of stop clip 64 to effectively "snap-in" through bore 56 so as to protrude within cylindrical passageway 48 as seen in FIGS. 21 and 22. This is illustrated diagrammatically by arrow 93. When so positioned, the embodiment of the coupler shown in FIG. 22 allows for tightening of screws 84 (see arrows 95) thereby securing rigid conduits 50 and 50' to coupler 40. Of course, stop clip 64 will "snap-in" bore 56 whenever a conduit is not beneath bore 56.

In the embodiment shown in FIGS. 1-5, the means for securing the first and second electrical conduits or EMTs to coupler 40 is by compression fittings comprising gland rings 88 and compression nuts 90. Compression nuts are threaded onto threads 92 formed on the outer ends of coupler body 44.

The embodiment of the electrical slip conduit coupler shown in FIGS. 1-5 typically has body 44 fabricated from either a cast zinc alloy or from a machined steel. Compression nuts 90 are typically fabricated from cast zinc alloy or machined steel, while the gland rings are typically fabricated from steel.

A second embodiment of the electrical slip conduit coupler is shown in FIGS. 6-10. This embodiment has corresponding elements as those of the first embodiment of the present invention with body 44 being a tube body typically fabricated from zinc plated steel. The outer periphery 46 of this embodiment is typically smooth as seen in FIGS. 6-10.

Figure 6:
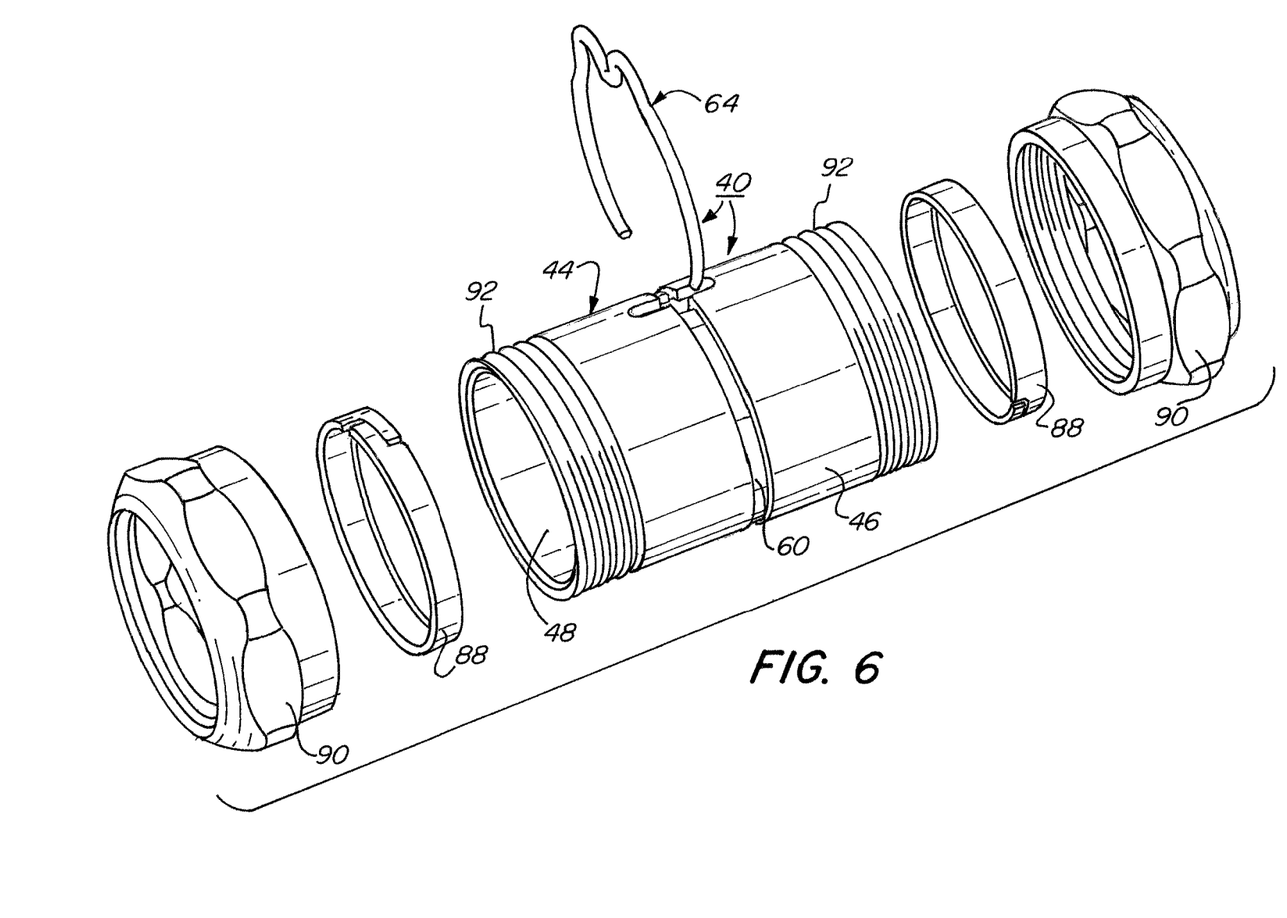
FIG. 6 is an exploded cross-sectional view of a second embodiment of the electrical slip conduit coupler according to the present invention.
Figure 7:
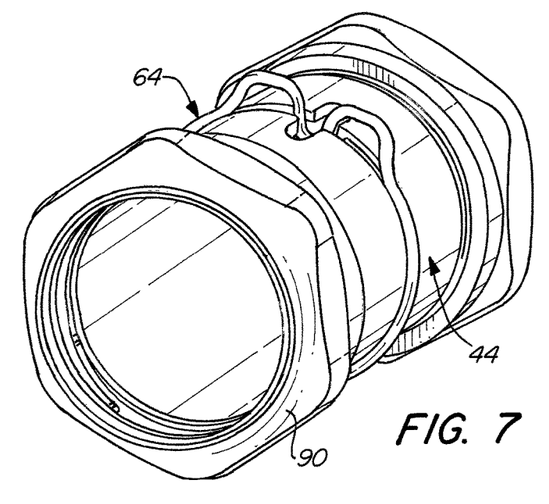
FIG. 7 is a perspective view of the second embodiment of the electrical slip conduit coupler shown in FIG. 6.
Figure 8:
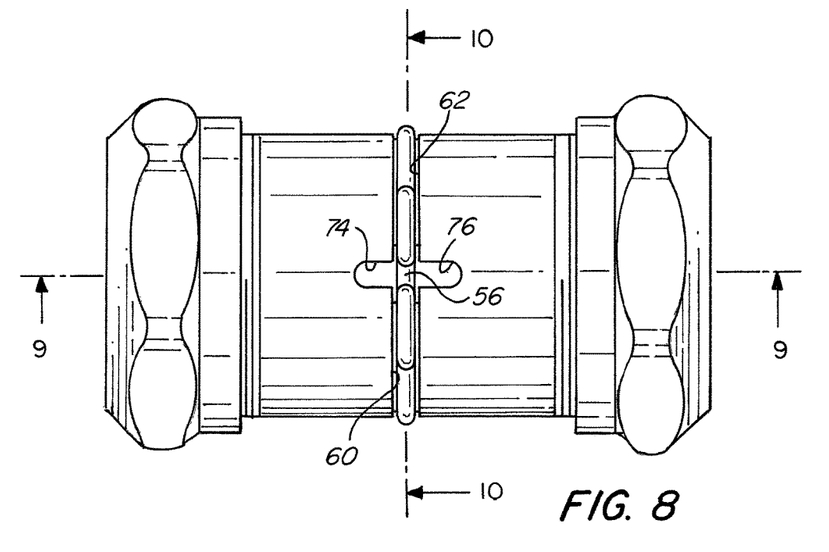
FIG. 8 is a top view of the second embodiment of the electrical slip conduit coupler shown in FIG. 7.
Figure 9:
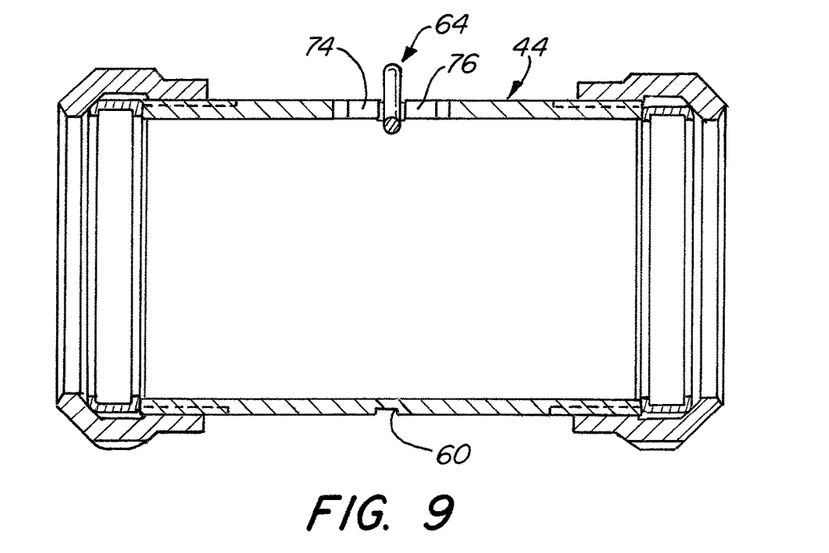
FIG. 9 is a cross-sectional view of the second embodiment of the electrical slip conduit coupler taken along line 9-9 of FIG. 8.
Figure 10:
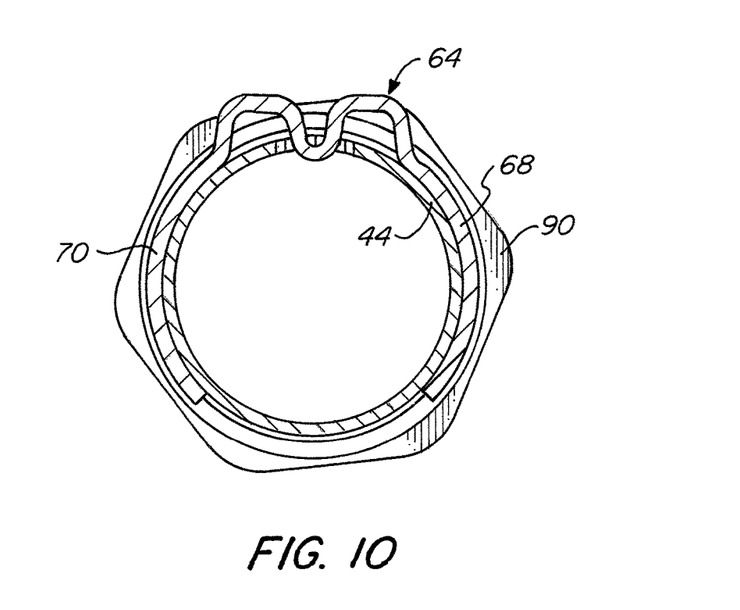
FIG. 10 is a cross-sectional view of the second embodiment of the electrical slip conduit coupler taken along line 10-10 of FIG. 8.
Figure 11:
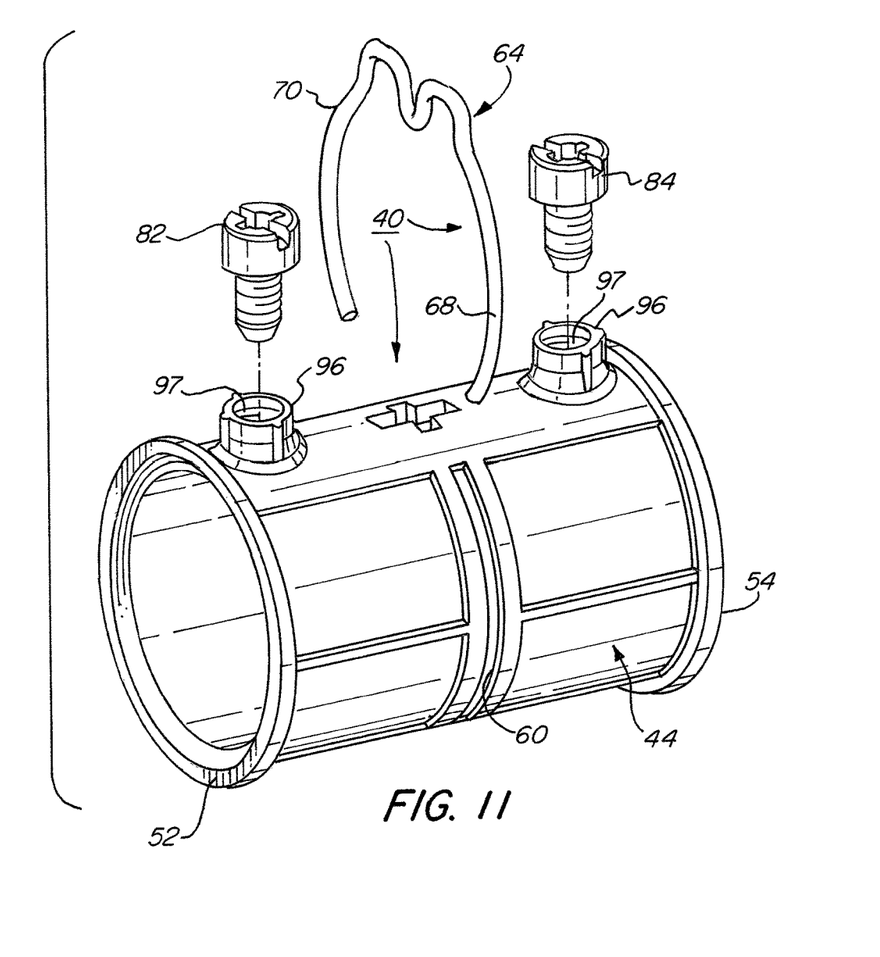
FIG. 11 is an exploded perspective view of a third embodiment of an electrical slip conduit coupler according to the present invention.
Figure 12:
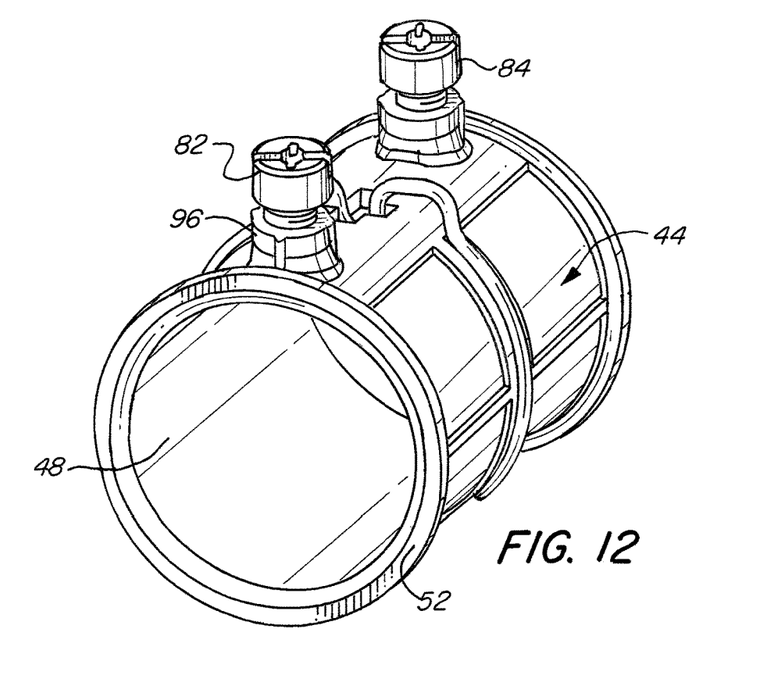
FIG. 12 is a perspective view of the third embodiment of the electrical slip conduit coupler shown in FIG. 11.
Figure 13:
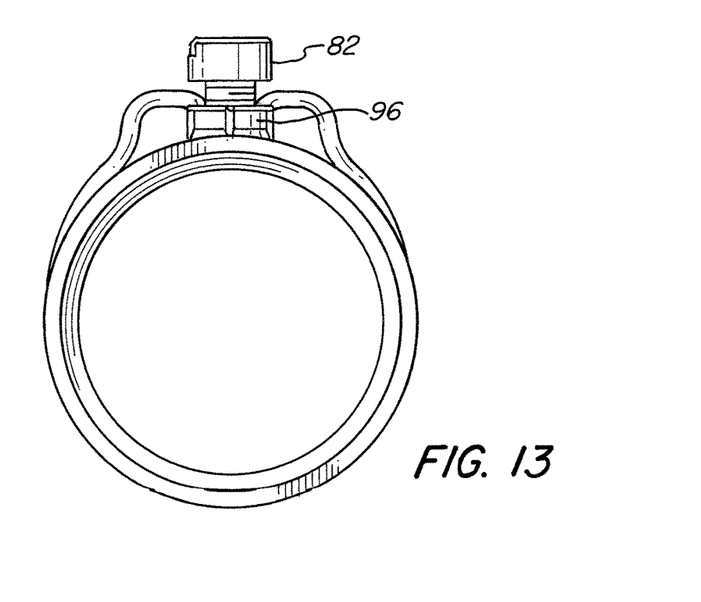
FIG. 13 is an end view of the third embodiment of the electrical slip conduit coupler.
Figure 14:
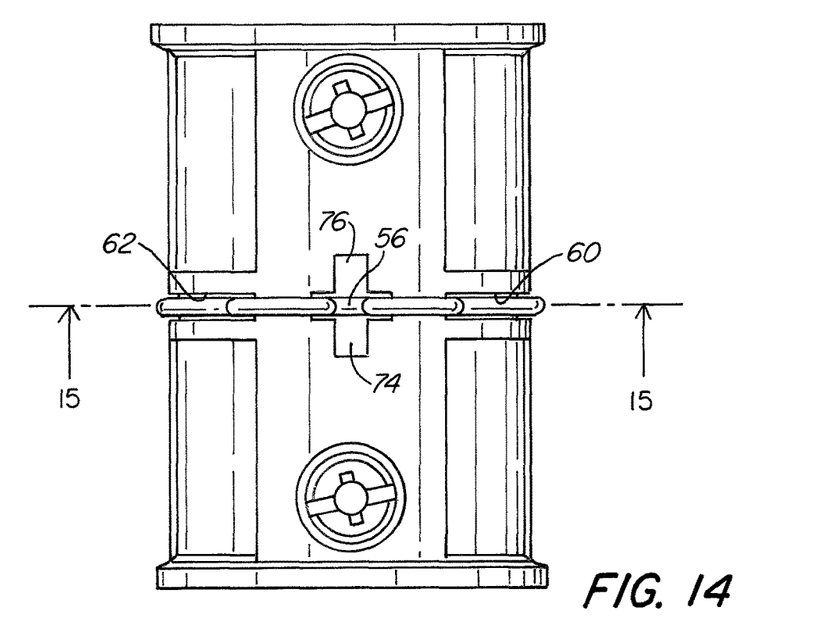
FIG. 14 is a top view of the third embodiment of the electrical slip conduit coupler.
Figure 15:
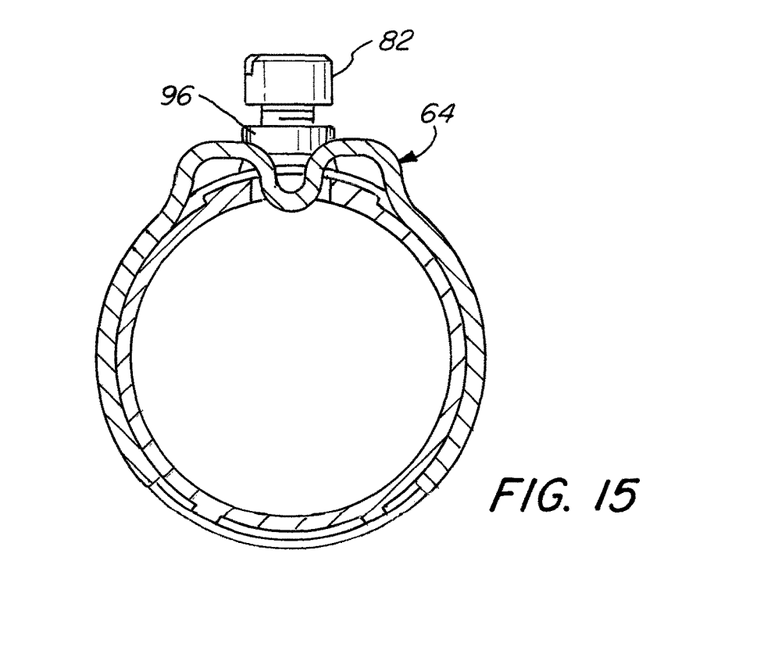
FIG. 15 is a cross-sectional view of the third embodiment of the electrical slip conduit coupler taken along line 15-15 of FIG. 14.
Figure 16:
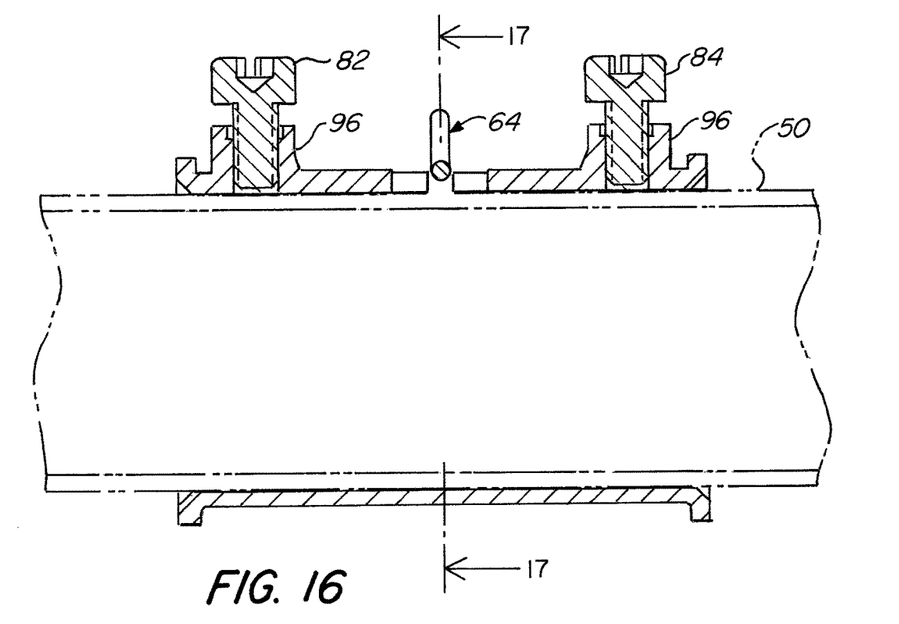
FIG. 16 is a cross-sectional view of the third embodiment of the electrical slip conduit coupler shown in FIG. 11 with the stop clip positioned outside of a bore passing through the body of the coupler so as to allow a conduit (shown in phantom) to pass through the coupler.
Figure 17:
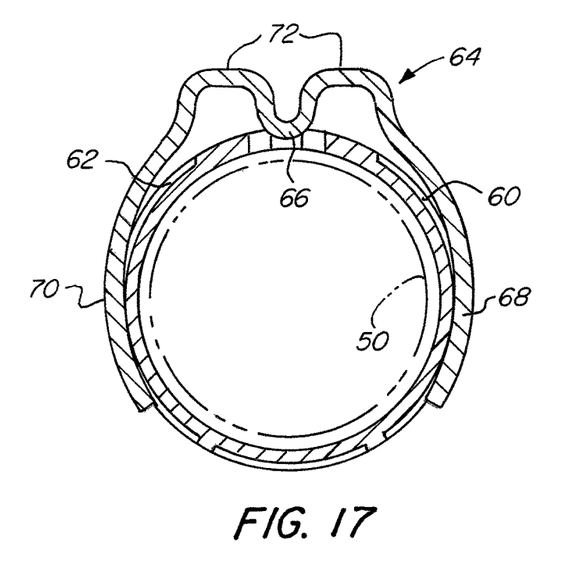
FIG. 17 is an end cross-sectional view of the third embodiment of the electrical slip conduit coupler taken along line 17-17 of FIG. 16 showing the stop clip above the bore in the coupler body.

In this embodiment, a continuous groove 60 extends around the body 44, thus forming first and second grooves 60 and 62. It is not necessary for the groove to be continuous around the body as shown in FIG. 6, but it is generally easier to fabricate such a continuous groove in a steel tube fabricated body.

As mentioned earlier, a third embodiment is shown in FIGS. 11-22 in which body 44 is cast, such as a cast zinc alloy body. Grooves 60 and 62 can then be cast into the body. In this embodiment, body 44 includes bosses 96 having internal threads 97 for receipt of screws 82 and 84, thereby securing first and second electrical conduits 50 and 50' as seen in FIG. 22.

Figure 23:
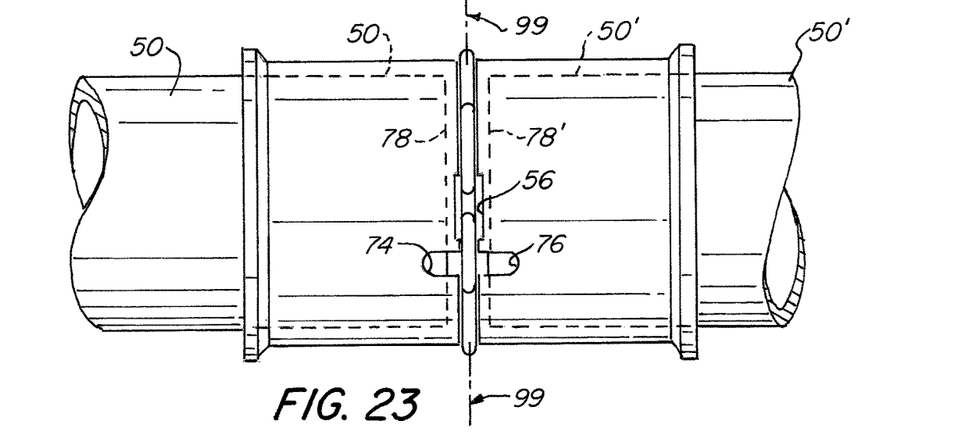
FIG. 23 is an alternative embodiment of the first sight slot and a second sight slot, where the first and second sight slots are separate from the bore located at approximately a midpoint along the longitudinal length of the coupler body.

Although first and second sight slots 74 and 76 may be formed adjacent bore 56, it is also possible to locate first and second sight slots 74 and 76 adjacent the center line 99 of the body 44, but positioned away from bore 56 as best seen in FIG. 23. Thus, the first and second sight slots just need to be adjacent the center line of the body to insure that ends 78 and 78' of conduits 50 and 50' are sufficiently inserted within body 44. If bore 56 is not positioned near the midpoint 99 of the body (i.e., closer to one end 52 than the other end 54), the sight slots would be positioned on either sides of this bore position.

Figure 24:
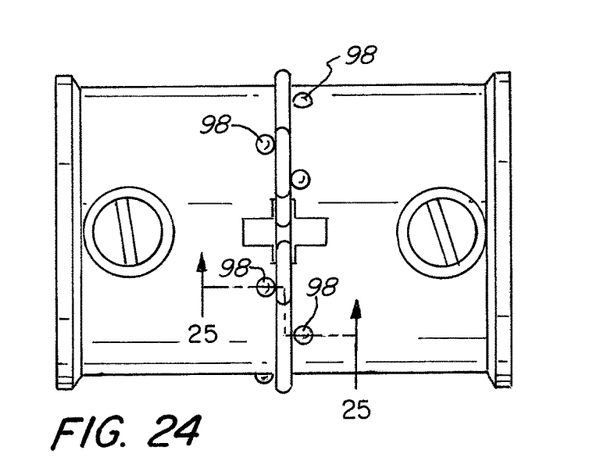
FIG. 24 is a top view of an alternative embodiment of the coupler body wherein the coupler body incorporates outwardly projecting dimples formed on the outer periphery of the body so as to define grooves for receipt of the stop clip.
Figure 25:
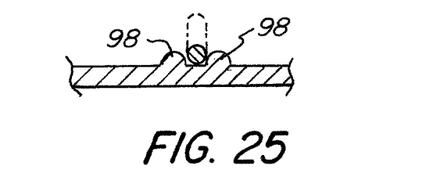
FIG. 25 is a cross-sectional view taken along line 25-25 of FIG. 24 showing the stop clip positioned relative to dimples formed on the coupler body.

As seen in FIGS. 24 and 25, instead of grooves being formed within the body in the manner as shown in FIGS. 1-22, the first and second grooves can effectively be fabricated by dimples 98 formed on the outer periphery 46 of the body. Such dimples effectively provide grooves for insuring that first and second arm portions 68 and 70 of the stop clip 64 are restrained from longitudinal or sideway movement relative to the longitudinal axis of body 44.

Since the stop clip includes at least one outwardly extending region 72 which extends above outer periphery 46 of body 44 when the stop clip is inserted into bore 56, as seen in FIG. 2, the stop clip can be moved radially upward relative to outer periphery 46 by inserting the blade 77 of a screwdriver 79 or some other tool between this outwardly extending region and the outer periphery 46 of the body. In this manner, the stop clip is moved upward relative to the body which allows for removal of the stop clip if it is desired to move the body relative to one of the conduits positioned in the body after the means for securing the conduits to the coupler. This allows for uninstallation of the conduits to the coupler in situations where it is necessary to remove one or more of the conduits.

Thus, the overall electrical slip conduit conductor according to the present invention provides a straightforward and secure coupler dimensioned for coupling two conduits together. The stop clip is configured to insure that the two conduits do not extend beyond the corresponding center line of the coupler, while the first and second sight slots insure that each conduit is sufficiently inserted within the cylindrical passageway of the body so as to insure a proper installation of the conduits to the coupler. Due to the spring action of the first and second arm portions of the stop clip, installation of conduits to the coupler is facilitated since the stop clip is dimensioned to snap into the bore positioned at the midpoint of the coupler body when the stop clip is not prevented from moving into the cylindrical passageway due to a conduit being positioned under the stop clip.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An electrical slip conduit coupler comprising:
    a body having an outer periphery and having a cylindrical passageway passing through the body between a first end of the body and a second end of the body, the cylindrical passageway dimensioned for receipt of a first electrical conduit at the first end of the body and for receipt of a second electrical conduit at the second end of the body, the body having a bore extending through the outer periphery of the body to said cylindrical passageway, the body further having a first groove and a second groove located along the outer periphery of the body on opposite sides of the bore;
    a stop clip having a central portion dimensioned to protrude through said bore and into the cylindrical passageway of the body so as to contact the first and the second electrical conduits positioned in the cylindrical passageway, the stop clip having first and second arm portions attached to the central portion, the first and second arm portions dimensioned to engage said first and second grooves when the stop clip central portion protrudes through the bore, wherein at least one of said first and second arm portions includes an outwardly extending region, the outwardly extending region dimensioned for receipt of a tool so as to lift the stop clip from the cylindrical passageway; and
    wherein the body includes a first sight slot and a second sight slot, each sight slot extending through the outer periphery of the body to said cylindrical passageway, the first sight slot positioned on the body so as to determine if the first electrical conduit is near said stop clip and the second sight slot positioned on the body so as to determine if the second electrical conduit is near said stop clip; and
    means for securing the first electrical conduit and the second electrical conduit or electrical metallic tubing (EMT) to the coupler.

2. The electrical slip conduit coupler according to claim 1, wherein the bore is located at approximately a midpoint along a longitudinal length of the body.

3. The electrical slip conduit coupler according to claim 2, wherein the first sight slot is near said midpoint of the body and closer to the first end of the body than the second end of the body and wherein the second sight slot is near said midpoint of the body and closer to the second end of the body than the first end of the body.

4. The electrical slip conduit coupler according to claim 1, wherein the body is fabricated from a steel tube.

5. The electrical slip conduit coupler according to claim 1, wherein both the first and second arm portions include an outwardly extending region, the outwardly extending region of each arm portion dimensioned for receipt of a tool so as to lift the stop clip from the cylindrical passageway.

6. The electrical slip conduit coupler according to claim 5, wherein each outwardly extending region is adjacent the central portion.

7. The electrical slip conduit coupler according to claim 1, wherein the stop clip is fabricated from spring steel.

8. The electrical slip conduit coupler according to claim 1, wherein the first and second arm portions are each generally arcuate in shape.

9. The electrical slip conduit coupler according to claim 1, wherein the body has external threads formed at each end of the cylindrical passageway and wherein the means for securing the first electrical conduit and the second electrical conduit to the coupler is a compression style coupling, each compression style coupling having a gland ring and a compression nut, the compression nut having internal threads for mating with the external threads of the body.

10. The electrical slip conduit coupler according to claim 1, wherein the body includes at least two bosses with internal threads passing through the outer periphery of the body, the bosses positioned on opposite sides of the body, and wherein the means for securing the first electrical conduit and the second electrical conduit to the coupler comprises screws dimensioned for threaded engagement with the threads of the bosses.

11. The electrical slip conduit coupler according to claim 10, wherein the body is fabricated from a cast zinc alloy.

12. The electrical slip conduit coupler according to claim 1, wherein the body is fabricated from a cast zinc alloy or machined steel.

13. The electrical slip conduit coupler according to claim 1, wherein the first sight slot and the second sight slot are integrally formed with said bore so as to form a cross-shaped bore.

14. The electrical slip conduit coupler according to claim 1, wherein the first groove and the second groove are each formed by dimples formed on the outer periphery of the body.

15. The electrical slip conduit coupler according to claim 1, wherein the outwardly extending region of the stop clip is adjacent the central portion of the stop clip.

16. A method of using an electrical slip conduit coupler according to claim 1, comprising the steps of:
    positioning the stop clip in the first and second grooves of the body with the central portion of the stop clip not fully inserted into the bore of the body;
    positioning the conduit coupler on a first electrical conduit so that said stop clip overlies said first electrical conduit;
    positioning a second electrical conduit so as to be substantially colinear with the first electrical conduit and sliding the conduit coupler toward the second electrical conduit until the stop clip central portion snaps inwardly relative to the bore so as to protrude through the bore into the cylindrical passageway; and
    securing the first electrical conduit and second electrical conduit to the coupler.

* * * * *